No. 757,575. PATENTED APR. 19, 1904.
G. W. ST. CLAIR.
SULKY.
APPLICATION FILED JAN. 11, 1904.
NO MODEL.
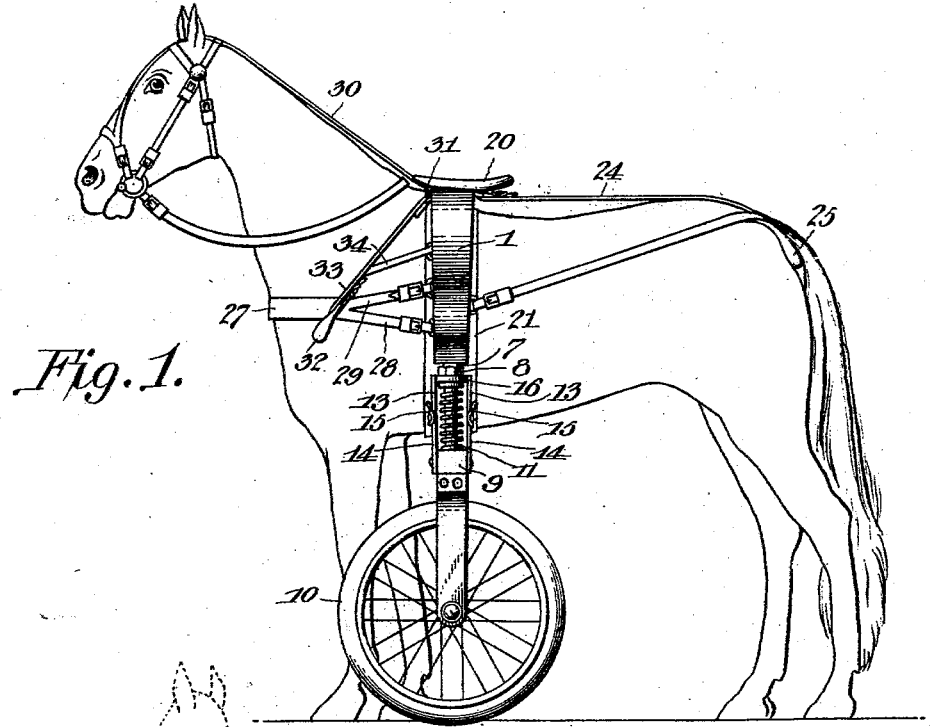
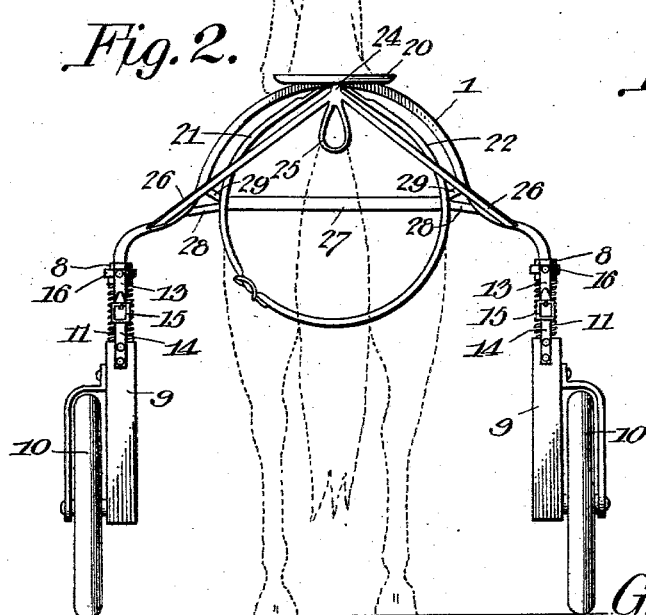
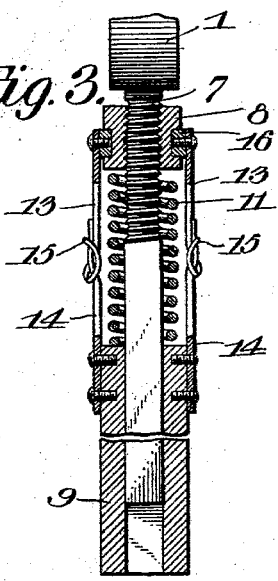
George W. St Clair,
Inventor
by C. A. Snow & Co.
Attorneys
Witnesses No. 757,575. Patented April 19, 1904.

UNITED STATES PATENT OFFICE.

GEORGE W. ST. CLAIR, OF LEXINGTON, KENTUCKY.

SULKY.

SPECIFICATION forming part of Letters Patent No. 757,575, dated April 19, 1904.

Application filed January 11, 1904. Serial No. 188,610. (No model.)

*To all whom it may concern:*

Be it known that I, GEORGE W. ST. CLAIR, a citizen of the United States, residing at Lexington, in the county of Fayette and State of Kentucky, have invented a new and useful Sulky, of which the following is a specification.

This invention relates to sulkies, and more particularly to shaftless sulkies intended for training and racing purposes.

The object of the invention is to provide the improved vehicle of the type specified, in which means is provided for adapting the vehicle to horses of different heights and which is so constructed that it may be secured by the harness in such relative position to the horse that a minimum of interference with the movement of the horse is occasioned by the sulky.

A further object of the invention is to provide a sulky of the type specified in which the driver's seat is a saddle so supported that it may be secured positively upon the horse's back without placing any weight upon the back of the horse, so placing the driver as far forward as possible, insuring a constant relative position of driver and horse and enabling the driver to maintain a better control over the horse than when he occupies a seat behind the horse as is customary.

With the objects above mentioned and others in view, which will appear as the invention is more fully described, the same consists in the novel construction, combination, and arrangement of parts of a sulky, as hereinafter described and claimed.

In describing the invention reference will be had to the accompanying drawings, forming part of this specification, in which I have illustrated a preferred form of embodiment of the invention, it being understood that changes in the form, proportions, and exact mode of assemblage of the elements exhibited may be made without departing from the spirit of the invention as defined in the claims or sacrificing any of the advantages thereof.

In the drawings, Figure 1 is a side view of the sulky secured in proper position in relation to a horse. Fig. 2 is a view from the rear of the sulky, the position of the horse relative thereto being indicated by dotted lines. Fig. 3 is a detail view showing the mode of adjusting the tension of the spring and the height of the frame.

Referring to the drawings, in which corresponding parts are designated by similar characters of reference throughout the several views, 1 designates the main frame of the sulky, which is formed in an arch, as shown, which is preferably about five feet in width and which is to be made as light as possible without sacrifice of strength. The arch of the frame lies quite close to the horse's body and the ends extend outward from the horse before bending downward to be joined to the wheel-carrying structure. At the lower ends of the frame 1 rods 7 are rigidly attached thereto, as shown in Fig. 3, said rods being threaded at their upper ends to receive adjusting-nuts 8 and being square in cross section below said threaded portions to serve as guides for brackets 9, which are slidably mounted on the rods and which afford support for the axles upon which wheels 10 are rotatably mounted. The springs are arranged between the adjusting-nuts 8 and the brackets 9, coiled springs 11 being the preferred form and being adjustable in tension by means of the adjusting-nuts 8. The movements of the brackets 9 under the influence of the springs 11 are limited by means of check-straps 13 14, connected by buckles 15 and associated with the brackets 9 and collars 16 or other suitable structures rotatably mounted upon the nuts 8.

The wheels 10 are preferably about twenty-eight inches in diameter and are of the usual type employed in modern sulkies, having slender wire spokes and pneumatic tires.

At the top of the frame 1 the driver's seat 20 is rigidly mounted, and from the under side of the driver's seat sections 21 and 22 of a pneumatic belly-band extend outward and downward to pass around the body of the horse in the usual position. Pads may be associated with the upper ends of said belly-band sections in order to give a suitable surface of contact with the back of the horse, and said pads and said belly-band sections are rigidly connected with the adjacent portions of the frame 1 to prevent any movement of the frame 1 relative to the body of the horse.

In order to hold the seat 20 for the driver in proper relative position, an adjustable connection 24 is provided between the seat and the crupper 25, and crupper-straps 26 extend from the crupper to the ends of the arched frame 1. The breast-strap 27 is connected with the frame by means of traces 28 and oblique connecting-straps 29. The checkrein 30, extending from a hook 31 at the front of the driver's seat to the bridle of the horse, also serves, in connection with the members above mentioned, to hold the seat in proper relative position to the back of the horse.

The seat 20 may be of any preferred construction; but as illustrated it closely resembles a flat saddle and has stirrups 32 connected therewith by means of straps 33, the forward swing of said stirrups being limited by straps 34, extending from the stirrups to the frame 1 and the adjacent portions of the bellyband sections.

It is of course to be understood that all the strap connections are adjustable in length whether such adjustability has already been specifically mentioned or not in order that the harness may be readily adapted to horses of different sizes.

When the apparatus is in use, it is secured in position upon the back of the horse, as shown in Figs. 1 and 2, and the driver occupies the seat 20, having his feet supported in the stirrups 32. The entire weight of the driver, as well as the weight of the frame 1 and the seat 20, is to be supported by the springs. In order that the required tension of the springs necessary to support drivers of different weights may be secured and in order that the apparatus may be readily adapted to horses of different sizes, the adjusting-nuts are provided on the rods 7, and the check-straps 13 14 are provided to control the movement of the frame under the influence of said springs. When the horse is tall, the adjusting-nuts 8 will be screwed downward on the rods 7 until the frame 1 is raised to the required height, and then the check-straps 13 14 will be adjusted in proper relative position by means of the buckles 15 connecting said straps. On the other hand, when the sulky is to be used with a small horse the adjusting-nuts 8 will be moved in the opposite direction, the proper position of the adjusting-nuts being determined in part by the height of the horse and in part by the weight to be sustained upon the driver's seat.

While I have provided means whereby the height of the sulky may be adapted to horses of different sizes, it is to be understood that the sulky may be manufactured with frames of different heights to suit horses of different heights, and so obviate the necessity for much adjustment of the nuts 8 upon the rods 7. Ordinarily, however, a sulky of standard size will be employed and the adjustment to horses of different heights will be effected by means of the devices already described, as no greater adjustment is required to adapt the sulky to horses of different heights than to adjust the harness to horses of different sizes.

As the frame 1 is thoroughly braced at the front and at the rear by suitable connections with the harness, it will be held in fixed position relative to the horse, and the wheels 10, carried by the brackets 9, will be held in proper relative position, because the square portions of the rods 7, upon which the brackets 9 are slidable, will prevent any rotative movement of the brackets on the rods.

From the foregoing description it will be clearly seen that by means of the yielding connections between the frame and the devices for securing the frame in position the weight of the driver is yieldably supported by the springs, while the position of the driver relative to the horse is kept constant. It will also be seen that the driver is enabled to occupy a position very close to the horse's head, by which he is enabled to exercise much more complete control over the horse than he is able to do when occupying a seat behind the horse, as he ordinarily does.

Having thus described the construction and use of my invention, what I claim as new, and desire to secure by Letters Patent, is—

1. In a vehicle of the class described, a yieldably-supported frame, a driver's seat mounted on said frame, and means for securing said driver's seat in fixed position relative to the body of the horse.

2. In a vehicle of the class described, a pair of wheels, a frame yieldably supported by said wheels, a driver's seat rigidly mounted on the frame, and means for securing the vehicle in fixed position relative to the body of the horse.

3. In a vehicle of the class described, an arched frame, devices for securing said frame in position over the body of a horse and fixed relatively thereto, brackets slidably mounted at the ends of said frame, cushioning devices between said brackets and said frame, and wheels mounted in said brackets.

4. In a vehicle of the class described, a wheeled frame, a seat rigidly mounted on said frame and means for securing said frame in position over the horse's back and fixed relatively to the body of the horse.

5. In a vehicle of the class described, an arched frame, wheeled brackets slidably connected with said frame, cushioning devices between said brackets and said frame, means for adjusting said cushions relative to said frame, and devices arranged between said frame and said brackets to limit the expansion of said cushioning devices.

6. In a vehicle of the class described, a frame, wheeled brackets slidably connected with said frame, cushioning devices between said brackets and said frame, and adjusting-straps disposed between said frame and each bracket whereby the expansion of said cushioning devices may be limited.

7. In a vehicle of the class described, an arched frame arranged to pass over a horse's back, wheeled brackets connected with said frame, cushioning devices between said brackets and said frame, and connections between said frame and the harness whereby said frame may be secured in fixed position relative to a horse.

8. In a vehicle of the class described, an arched frame adapted to pass over the back of a horse, means for securing said frame firmly in position relative to the horse, wheeled brackets slidably connected with said frame, cushioning devices between said brackets and said frame, and means for adjusting said cushioning devices relative to said brackets and said frame in order to adapt the frame to horses of different heights.

9. In a vehicle of the class described, a wheeled frame adapted to pass over a horse's back, harness adapted to secure said frame in fixed position relative to the body of a horse immediately behind the horse's shoulders, a seat fixed upon the top of said frame, and stirrups supported in front of said frame and slightly below the level of the seat.

10. In a vehicle of the class described, a wheeled frame adapted to be secured in position behind the horse's shoulders, a driver's seat mounted upon said frame, harness adapted to hold said frame in fixed position relative to the body of the horse, stirrup-straps extending forward from said seat and said frame, and stirrups carried by said straps.

In testimony that I claim the foregoing as my own I have hereto affixed my signature in the presence of two witnesses.

GEORGE W. ST. CLAIR.

Witnesses:
 FRANK P. KENNEY,
 SCOTT HUDSON.